(12) United States Patent
Granade et al.

(10) Patent No.: US 8,749,797 B1
(45) Date of Patent: Jun. 10, 2014

(54) SYSTEM AND METHOD FOR REMOTELY DETERMINING POSITION AND ORIENTATION OF AN OBJECT

(75) Inventors: Stephen Granade, Madison, AL (US); Michael K. Balch, Madison, AL (US); Matthew A Kliesner, Madison, AL (US)

(73) Assignee: Advanced Optical Systems Inc., Huntsville, AL (US)

( * ) Notice: Subject to any disclaimer, the term of this patent is extended or adjusted under 35 U.S.C. 154(b) by 280 days.

(21) Appl. No.: 12/932,664

(22) Filed: Mar. 2, 2011

Related U.S. Application Data

(60) Provisional application No. 61/339,259, filed on Mar. 2, 2010.

(51) Int. Cl.
*G01B 11/14* (2006.01)

(52) U.S. Cl.
USPC ............................ 356/614; 356/401; 356/445

(58) Field of Classification Search
USPC .......................................... 356/614, 401, 445
See application file for complete search history.

(56) References Cited

U.S. PATENT DOCUMENTS

| | | | |
|---|---|---|---|
| 4,836,778 A | | 6/1989 | Baumrind et al. |
| 4,896,962 A | | 1/1990 | Menn et al. |
| 5,235,513 A | * | 8/1993 | Velger et al. ................. 701/16 |
| 5,552,883 A | * | 9/1996 | Busch-Vishniac et al. ................. 356/139.03 |
| 5,828,770 A | * | 10/1998 | Leis et al. ..................... 382/103 |
| 5,884,239 A | | 3/1999 | Romanik, Jr. |
| 5,987,349 A | | 11/1999 | Schulz |
| 6,266,142 B1 | | 7/2001 | Junkins et al. |
| 7,403,295 B2 | | 7/2008 | Seo |
| 7,681,839 B2 | | 3/2010 | Mickley et al. |
| 7,686,252 B2 | | 3/2010 | Mickley et al. |
| 7,689,130 B2 | | 3/2010 | Ashdown |

OTHER PUBLICATIONS

Stephen Granade, helicopter remote manipulation of external sling loads, American Helicopter Society presentation, May 27-29, 2009.

\* cited by examiner

*Primary Examiner* — Tarifur Chowdhury
*Assistant Examiner* — Isiaka Akanbi
(74) *Attorney, Agent, or Firm* — Mark Clodfelter

(57) ABSTRACT

A system is disclosed for remotely determining 6 degree of freedom of an object. Four or more radiating beacons are placed on an object, the beacons each simultaneously radiating a synchronized repeating code, the code being different for each beacon. A position sensor, such as a quadrant detector, receives the light signals from the beacons, and correlates the received beacon signals against the same signal sequences produced in the receiver. With orientation of the beacons on the object being known, and orientation of the quadrant detector, or receiver, being known, roll, pitch, yaw, and X, Y and Z position in a coordinate space of the object can be determined.

14 Claims, 7 Drawing Sheets

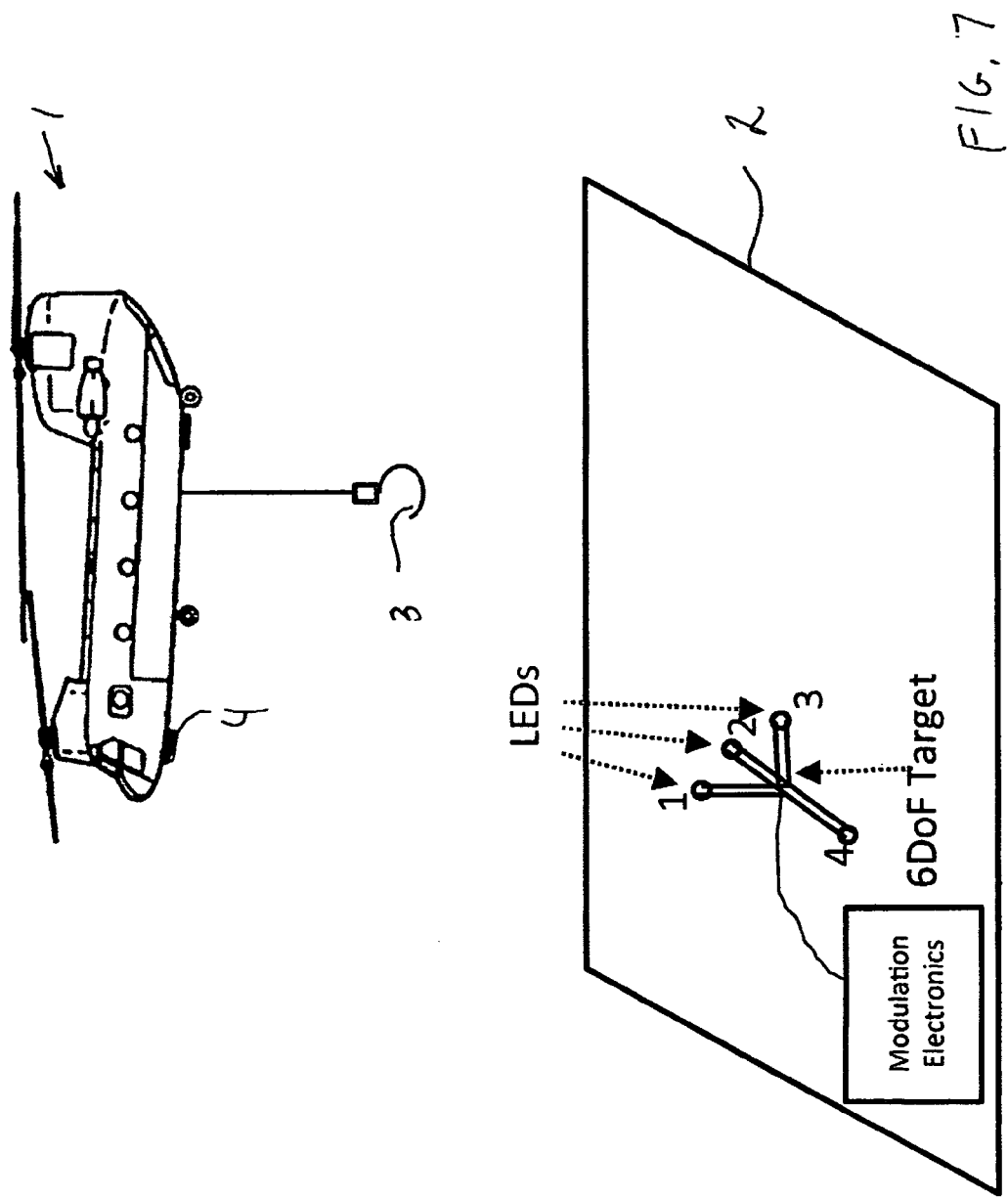

US 8,749,797 B1

SYSTEM AND METHOD FOR REMOTELY DETERMINING POSITION AND ORIENTATION OF AN OBJECT

CROSS-REFERENCE TO RELATED APPLICATIONS

This application claims the benefit of Applicants provisional application No. 61/339,259, filed Mar. 2, 2010, and which is incorporated herein in its entirety by reference.

FIELD OF THE INVENTION

This application relates in general to the field of position and orientation measurement of objects, and more particularly to a system and method of remotely measuring 6 degree of freedom (roll, pitch, yaw, and x, y and z with respect to a coordinate system) of an object.

BACKGROUND OF THE INVENTION

As is known in the art, systems are available for determining spatial position and angular orientation, or 6 degrees of freedom, of an object. In other words, these systems determine roll, pitch and yaw, and X, Y and Z position within some arbitrary coordinate system. One such system involves locating three or more fixed points on an object via a position-sensitive detector. The detector records each fixed point's projected two-dimensional location on the detector. Given a priori knowledge of the geometrical arrangement of the fixed points on the object and their projected two-dimensional location on the detector, the system uses mathematical processing to determine position and angular orientation of the object (i.e. six degrees of freedom: x, y, and z positions and pitch, yaw, and roll angular orientations) in space relative to a coordinate system centered at a preselected point in space, typically at a point fixed relative to the detector.

Such systems have many applications. For example, by selecting different points on the landing deck of a ship, a helicopter or plane could measure how the deck was moving and use that information to land automatically.

There are multiple methods for marking fixed points on an object. One such method includes passive retro-reflectors affixed to the object, which reflect optical, radar, or other electromagnetic radiation beamed at the object back to the detector. Another method includes active radiating emitters affixed to the object. There are also multiple position-sensitive detector systems. One such detector system is an imager, such as a digital camera, that divides the imaged space into pixels and determines the two-dimensional location of each point by its pixel location. A second detector system is an analog position-sensitive device that centroids the incoming light and produces a voltage that varies depending on the light's location on the detector.

Prior position and orientation measurement systems and methods suffer several disadvantages. Analog position-sensitive devices centroid all of the light that falls onto them at once, preventing them from identifying all of the fixed points on the object at once. To avoid this, previous systems and methods such as the one described in U.S. Pat. No. 6,266,142 have the fixed points marked with beacons that radiate one at a time. That way, the detector can identify each beacon in turn until all beacons have illuminated the detector. This is a slower approach than locating all fixed points at once, and becomes even slower as additional points are added. In addition, the transmitting beacons and the position-sensitive detector must be synchronized, adding to the system's complexity. Other previous systems and methods, such as the one described in U.S. Pat. No. 4,896,962, use beacons such as light-emitting diodes (LEDs) and a two-dimensional imager such as a digital camera. Locating the beacons in a two-dimensional image requires more computing and processing power than doing the same with analog position-sensitive devices, and the beacons are not uniquely identified.

In view of the foregoing, it is apparent that there is a need for an inexpensive system that will accurately and quickly determine orientation and position of an object, irrespective of whether there is or is not relative movement between a detector and beacons on the object.

SUMMARY

In accordance with the invention, four or more beacons are placed on or affixed to an object whose position and orientation is to be detected. The beacons each emit light whose brightness is varied in accordance with a code, with each beacon emitting a separate, unique code different from a code emitted by other beacons. An analog position-sensitive detector detects the signals from all the beacons and outputs an electrical output signal corresponding to the light signal of the beacons. A computing device receives the electrical output signal and detects and separates codes from the respective beacons, thus also detecting location of each beacon on the object. With the beacons placed at known, predetermined locations on the object, the orientation and location of the object is thus known.

BRIEF DESCRIPTION OF THE DRAWINGS

FIG. 7 is an illustration showing one possible use of the system of the invention.

DETAILED DESCRIPTION OF THE DRAWINGS

Figure 1:
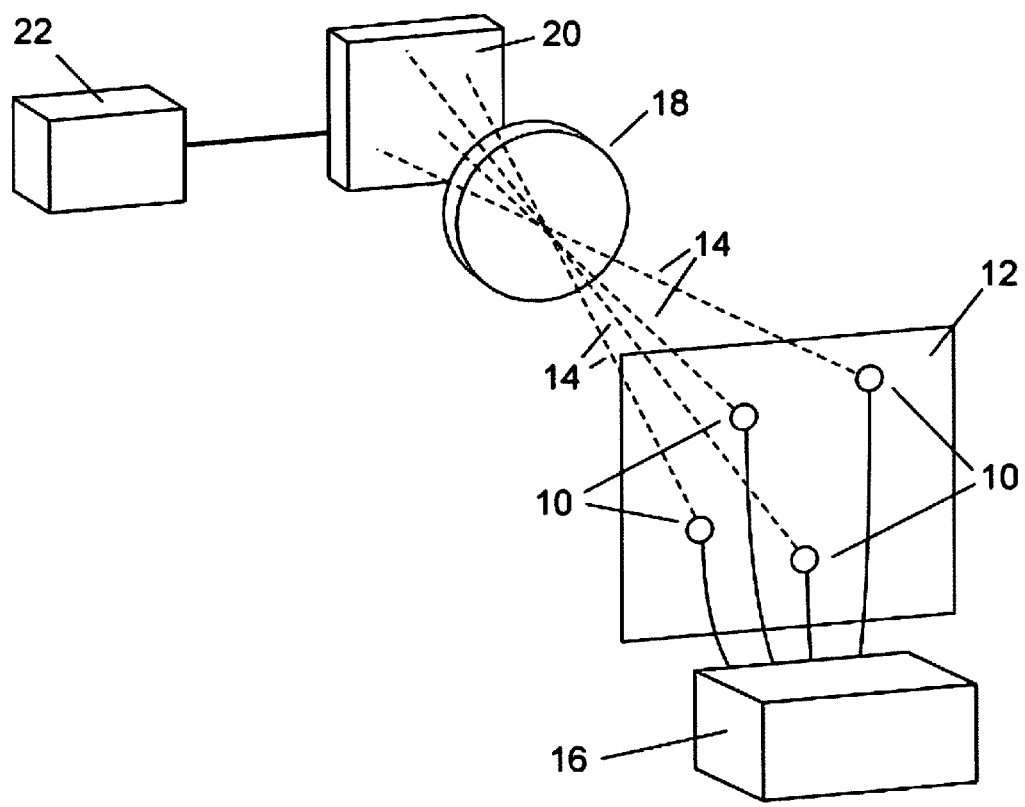
FIG. 1 is a diagram illustrating a noncontact position and orientation measurement system in accordance with an embodiment of the present invention.

FIG. 1 shows a first embodiment of the noncontact position and orientation measurement system. The system comprises four or more beacons 10 placed on an object 12, which may be a vehicle whose position and orientation is to be measured. The beacons are placed on object 12 in an orientation or pattern corresponding to a known orientation of object 12.

One use of the invention, and referring to FIG. 7, would be to facilitate an unmanned or manned helicopter 1 finding a particular load pallet 2 from several pallets, aligning itself with the pallet, descending to engage a hook 3 on the pallet, and then picking up the load and carrying it to the destination. The helicopter contains the receiver electronics, and the quad detector in a package 4. The load pallet is the target, and has modulation electronics and associated beacons, such as four LED code emitters each emitting a different code in the form of light signals. The receive electronics are programmed with the same four modulation codes used to modulate the four LEDs. The quad detector and receiver electronics acquires the target, and calculates its 6 degree of freedom relationship to the helicopter quad detector. The pattern the LEDs are placed on the load pallet is known. The relationship of the quad detector to the helicopter and hook is known. As such, it is possible to calculate the 6 degree of freedom relationship of the hook to the load pallet, allowing the helicopter to automatically pick up the load pallet.

Nominally, 4-6 beacons are used because this number of beacons gives good resolution of position and orientation, while any more than about 6 beacons does little to improve accuracy of the system. As noted, the object 12 (FIG. 1) upon which the beacons are placed may be stationary or moving. Beacons 10 may be light emitting diodes (LEDs), lasers, incandescent lamps, fluorescent lamps, or other light sources, and emit light signals of a wavelength suitable for detection by sensors of the instant invention. Typically, when used in the atmosphere, light frequencies of the beacons would be selected to be within absorption bands of sunlight so that such frequencies from the sun would not saturate the detectors or wash out signals from the beacons.

The beacons 10 are controlled by a beacon controller 16. Beacon controller 16 supplies power to the beacons 10 and varies power individually to each beacon in accordance with a code to cause respective beacons to illuminate brighter or dimmer over time in accordance with the code. Each beacon 10 emits its own separate, unique code. The light signals 14 from the beacons 10 are recorded by a position-sensitive detector 20. The position-sensitive detector 20 centroids, or detects a centroid of light received from each of the beacons. As a feature of the invention, detector 20 may be an analog quadrant silicon photodetector, a lateral-effect position sensitive detector, or other suitable detector devices that centroid incoming light. These detectors are inexpensive, simple to integrate into a circuit and simple to use. The light signals 14 may be focused on the detector 20 by a lens 18. The lens 18 may be a standard lens, a wide angle lens, a Fresnel lens, a multiple-element lens, or other light-gathering lens suitable for focusing light from the beacons onto a light detector.

The position-sensitive detector 20 generates a current that is dependent on the central location of all light signals 14 reaching the detector 20. In other words, the current is maximized when light from all the sensors impinges on the detector. The current also varies depending on strength of the light signals 14. Here, the further away the detector is positioned from the beacons, the fainter the light signals from the beacons will be, resulting in less current being produced by the detector. These currents are digitized and recorded by a computing platform 22. The computing platform performs calculations to separate the codes transmitted by each beacon 10, identifying each beacon and allowing all of the positions of the light signals 14 on the detector 20 to be determined at once. The computing platform may be a single-board computer, laptop, embedded computer, mainframe, or other computing device capable of digitizing signals from the detector 20 and performing the necessary computations to isolate each of the codes transmitted by beacons 10.

Figure 2:
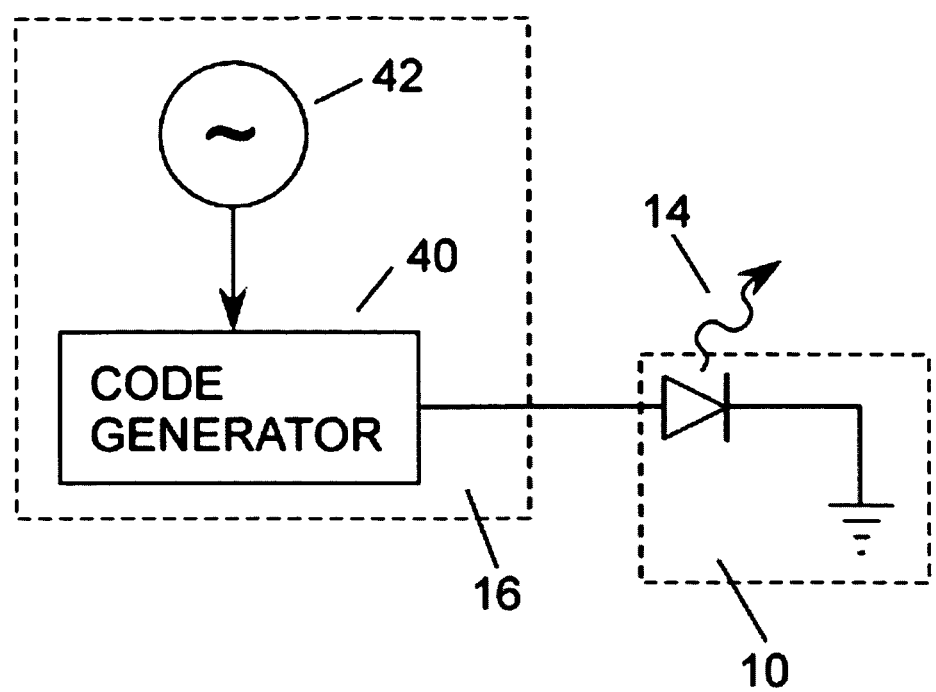
FIG. 2 is a block diagram of the process used by a beacon transmitting a code in accordance with an embodiment of the present invention.

FIG. 2 shows the process by which the beacon controller 16 drives a beacon 10 to transmit a code. For simplicity, only one code generation channel and one beacon 10 is shown, but the beacon controller 16 may contain multiple code generation channels for multiple beacons 10. Codes are generated by a code generator 40 whose rate is controlled by a clock 42, which determines frequency of the transmitted code. Typically, the clock frequency, and thus a rate at which the code is emitted by the beacons, would be on the order of between about 10 Hz to 100 Hz, with about 50 Hz being nominal. The code generator selects a pseudo-random code from a list of codes selected to have strong autocorrelation properties and low cross-correlation properties. Examples of these codes include, but are not limited to, Kasami code and Gold code sequences. As noted above, a different and distinct code is applied to each beacon so that each beacon emits a different, distinct pseudo-random code that does not change, and which repeats. Typically, 1024 repeating code increments are transmitted by each beacon. In other words, clock 42 will generate 1024 clock pulses at a rate of between about 10 and 100 Hz to clock out a complete code sequence.

Figure 3:
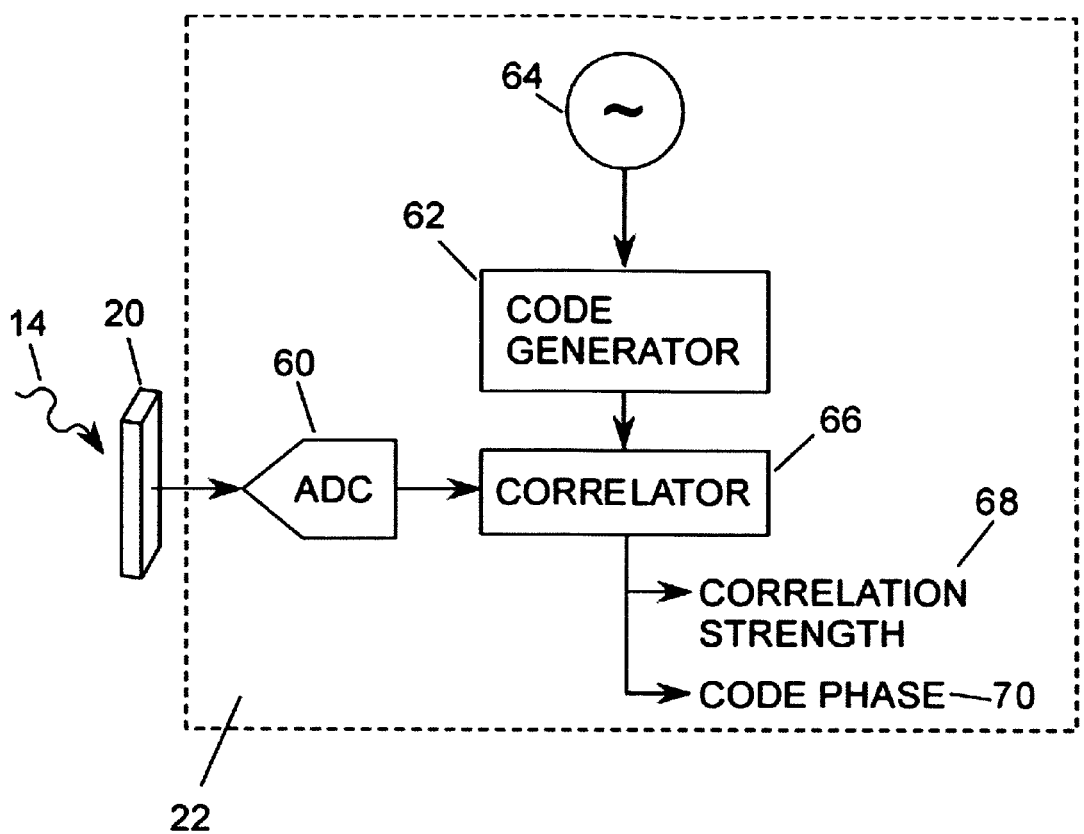
FIG. 3 is a block diagram of the process used by a receiver receiving codes from beacons in accordance with an embodiment of the present invention.

FIG. 3 shows how the computing platform 22 performs calculations to separate the separate codes transmitted by respective beacons. For simplicity, only one code detection channel is shown, but the computing platform 22 may contain multiple code detection channels for multiple beacons. As noted, between 3 and 6 or more beacons may be used. Here, smaller objects may require fewer beacons, while larger objects may require more beacons. Where 6 beacons are used in conjunction with a quad detector, and computing platform 22 is implemented by an FPGA, 24 computing channels could be established and used in the FPGA in order to simultaneously perform the calculations to isolate the code from each beacon and establish a position of the beacon.

Light signals 14 from a beacon are recorded by a position sensitive detector 20 and are converted into analog electrical signals. These signals are sent to an analog-to-digital converter (ADC) 60, which convert the analog signals into digital signals. A code generator 62 generates a pseudo-random code that matches a one of the codes transmitted by one of the beacons. As such, where there are 6 beacons, and the computing electronics is integrated in an FPGA for simultaneous detection of codes from all 6 beacons, there would be 6 discrete code generators for generating the respective codes from the 6 beacons on the object or target, and 24 computation channels in the FPGA to perform the computations. As stated, the code generator 62 is driven by a clock 64 whose frequency matches that of the beacon controller clock 42 shown in FIG. 2. A correlator 66 calculates the mathematical correlation between the code generated by the code generator 62 and the digital signals from the ADC 60. The correlator 66 outputs the correlation strength 68 and the code phase 70. The correlation strength 68 is a measure of how strongly the light signals 14 match the chosen code. If the correlation strength 68 is higher than a previously-determined threshold, then the beacon generating that code has been detected.

Figure 4:
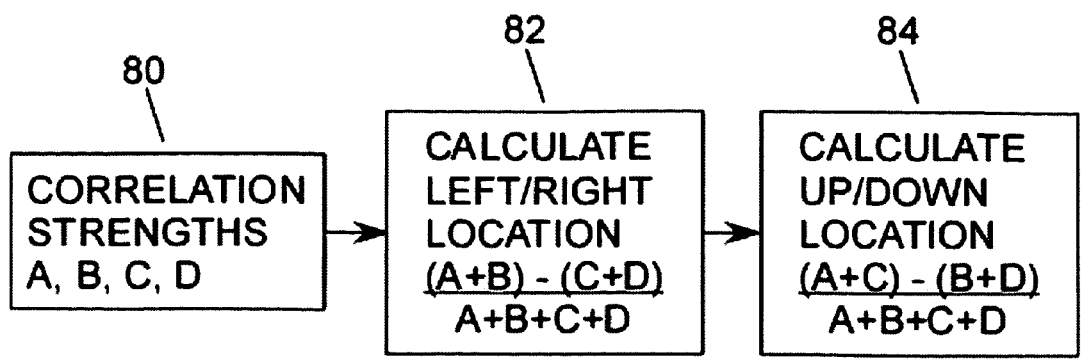
FIG. 4 is a diagram that shows how a position-sensitive quadrant detector determines the location of light falling on it in accordance with an embodiment of the present invention.

FIG. 4 shows the flowchart for computing the two-dimensional location of the light from one beacon falling on an analog, position-sensitive quadrant silicon photodetector. Quadrant detectors have four active areas on the top left, top right, bottom left, and bottom right that respond to light. The signal from each of these areas is passed through a code detection channel as shown in FIG. 3. As shown at box 80 (FIG. 4), the code detection channels produce four correlation strengths A, B, C, and D. At boxes 82, 84 the left/right location of the light and the up/down location of the light from each beacon is calculated. By correlating on 6 beacons, and using a quad detector to determine location of each beacon, azimuth and elevation is found for all 6 beacons, which gives 6 degrees of freedom for the subject target or object. The code detection channels shown in FIG. 3 and the process of computing the left/right and up/down location of the light shown in FIG. 4 are performed for every code being broadcast by a discrete beacon, producing the two-dimensional location of every beacon's light on the quadrant detector.

While simultaneous detection and determination of location of each beacon is disclosed in order to speed the process, it should be apparent that only a single calculation channel, or multiplexed channels, could be used in order to detect and locate the beacons in a serial manner by simply having the code generator and calculation channel operate on a single channel at a time.

There is no need for a communication link between the modulation electronics and the receive electronics other than the blinking LEDs of the beacons. All LEDs on a single target or object are blinked synchronously, using codes of the same length. In other words, a single clock pulse can be used to clock the codes from all the beacons so that all the codes from the beacons start on the same clock pulse and end on the same clock pulse. Therefore, all code start times can be determined once a single code start time has been found.

To compensate for drift between the clock that clocks the beacons and the clock in the receiver, a check is performed at the beginning of each code sequence of the beacons. If any drift is found, then adjustments may be made, for instance by slightly adjusting rate of the receiver clock, or inserting or deleting a clock pulse. This would occur where the clock actually runs at a multiple of the sampling rate of 1024 bits per second, allowing a portion of a bit at the sampling rate to be inserted or deleted in order to adjust for drift.

The receive electronics uses a single, separate correlation engine to perform synchronization or acquisition of the LED codes. One way to synchronize the detected codes from the quadrant detector to the receiver is to continuously correlate the summation of the start bit, i.e. the sum of the first bit of all sequences emitted by the beacons, against the sum of all bits detected by the quadrant detector. When the sequence transmitted by the beacons rolls over from the end of the 1024 bit sequence to the first bit at the beginning of the sequence, a high correlation peak is seen, and synchronization is maintained between the receiver and the beacons. Another way to synchronize the receiver with the beacons is to store a full sequence of 1024 bits that are summed, i.e. the sum of all beacon codes, and perform a full correlation against a full sequence of 1024 received and summed beacon codes produced at the receiver. This produces a strong correlation peak indicating where in the sequence the beacons are emitting, and an offset required to synchronization the receiver to the beacons. Also, since it is known that all LEDs are blinking synchronized individual codes, the correlation engine looks for the SUM of all LED codes, rather than an individual code. The summing of quadrants as well as the summing of LED codes produces a very high signal to noise ratio, making it easy to find the correlation peak in time. The position in time of the resulting correlation peak indicates the start time of all LED pulses. Because the LED codes are sent repeatedly at a known rate, it is possible to predict when in time the next coded pulse will occur. With this information, individual LED codes can be correlated with each quadrant pulse. A total of 4×(number of LEDs) correlations are required to obtain sufficient information to calculate 6 degree of freedom of the target. Because the location in time of all correlations is now known, it is not necessary to perform full correlations on each code and quadrant. It is only necessary to do a single multiplication between the received quadrant signal and the synchronized code from the receiver.

Figure 5:
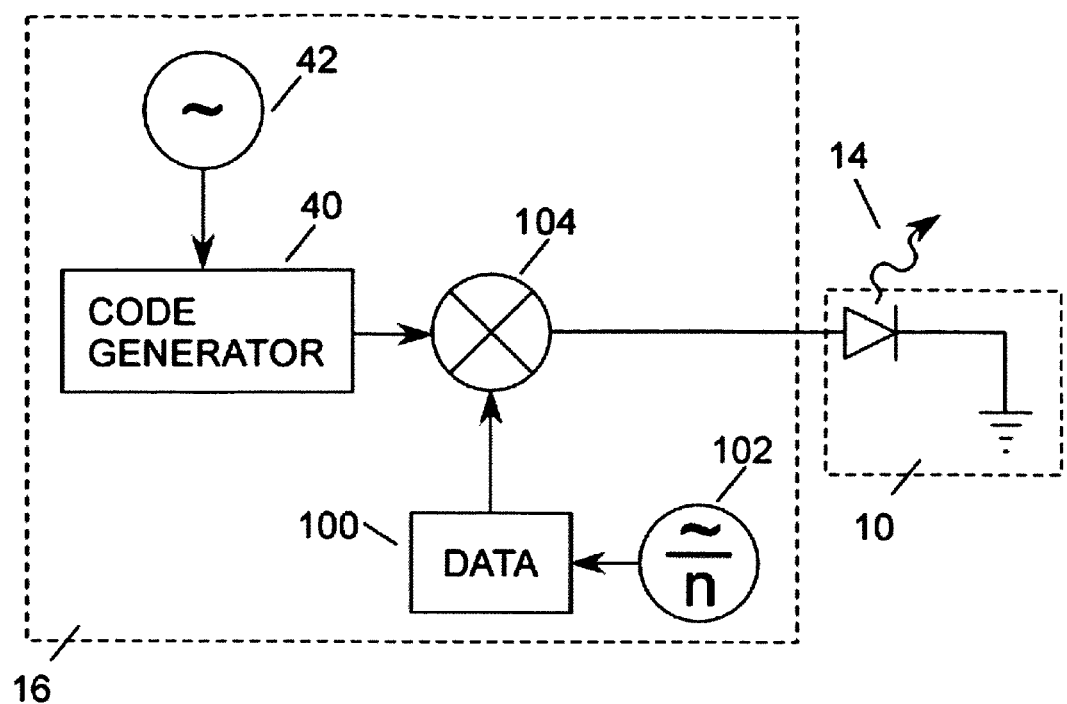
FIG. 5 is a block diagram of the beacon transmitting not only a code but also additional data.
Figure 6:
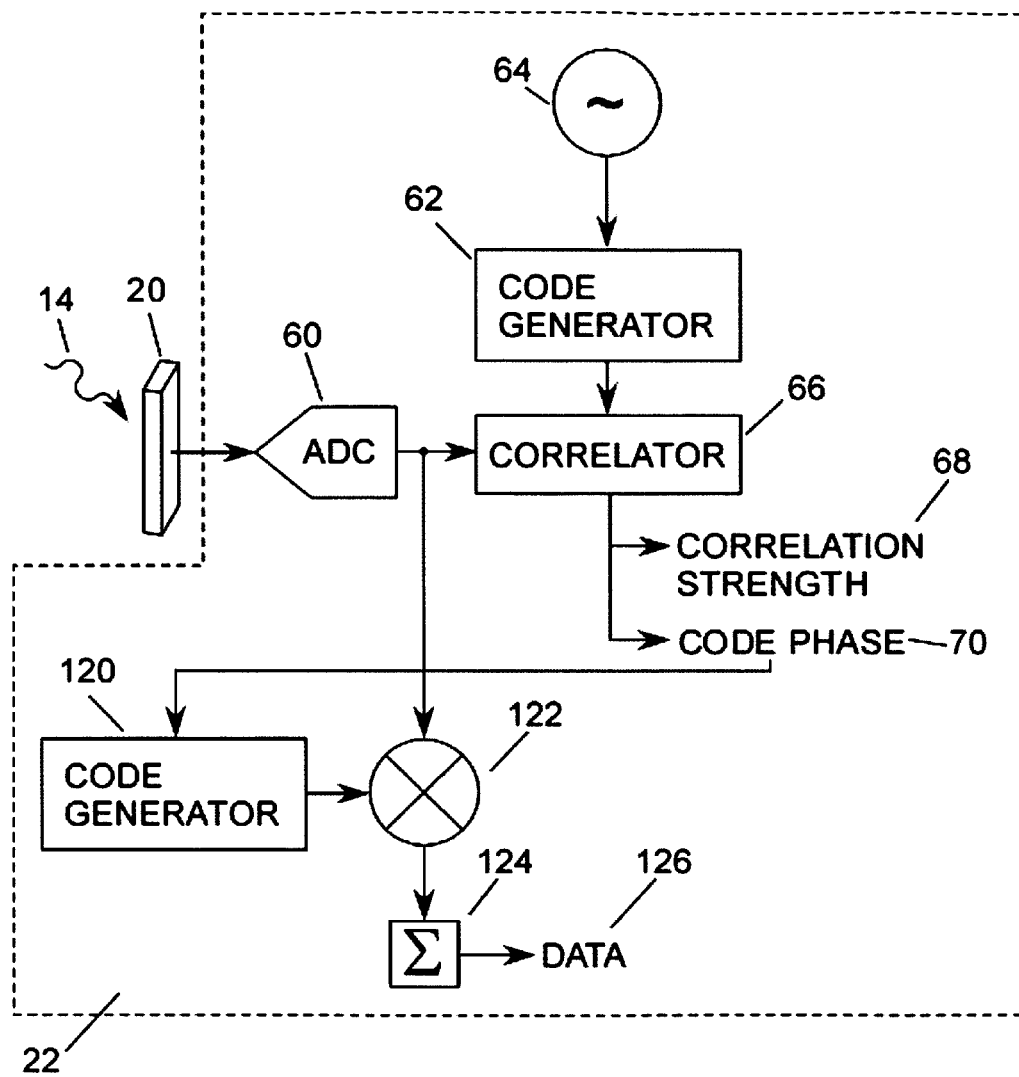
FIG. 6 is a block diagram of the receiver receiving not only codes from beacons but also additional transmitted data.

FIGS. 5 and 6 show an embodiment in which each beacon, in addition to transmitting a pseudorandom code for position information, also transmits additional data, creating a communication channel between the beacon and the computing platform. This is a form of communication known as direct-sequence spread spectrum, although other protocols of communication, such as frequency-hopping spread spectrum, chirp spread spectrum, or other communication protocols may be used.

FIG. 5 shows an embodiment in which the beacon controller 16 drives a beacon 10 to transmit both a code and additional data. The digital data 100 is transmitted at a rate controlled by a clock 102. The rate of clock 102 matches that of clock 42 divided by an integer n. The data 100 and the pseudorandom code generated by the code generator 40 are combined by a multiplier 104. The combined code and data drives the beacon 10, whose light signal 14 is varied based on both the transmitted code and the data.

FIG. 6 shows another embodiment in which the computing platform 22 performs calculations to separate the codes transmitted by each beacon and to decode the data being transmitted by each beacon. The code phase 70 as determined by the correlator 66 is used to time the code generated by a second code generator 120. The code generator 120 generates the same code as generated by the code generator 62. The digitized signals from the analog-to-digital converter (ADC) 60 are sent both to the correlator 66 and to a multiplier 122. The multiplier 122 multiplies the signal from the ADC 60 with the code generated by the code generator 120. The result is added together by a summation block 124, which yields the bits of the data 126.

According to the foregoing, we have provided a non-contact position and orientation measurement system that identifies all of the selected fixed points on the object to be measured at once, speeding operation of the system. Our system does not require that the transmitting beacons on those fixed points and the position-sensitive detector be synchronized, nor does it require a two-dimensional imager.

While the above description contains many specificities, these should not be construed as limitations on the scope of any embodiment, but as exemplifications of the embodiments described. Many other variations are possible within the teachings of this disclosure. For example, the beacons, instead of emitting light themselves, could be mirrored reflectors with a shutter, such as an LCD shutter, that reveals and hides the reflectors to create a code. The reflectors could then be illuminated by a laser, light emitting diodes (LEDs), incandescent lamps, fluorescent lamps, or other light sources, and the reflected light detected by the position-sensitive detector.

Having thus described our invention and the manner of its use, it should be apparent to one skilled in the relevant arts that incidental changes may be made thereto that fairly fall within the scope of the following claims, wherein we claim:

1. A method comprising:
   mounting a plurality of indicators in known relation on an object,
   simultaneously emitting a unique signal from each indicator of said plurality of indicators so that each said indicator emits a said unique signal, said unique signal comprising a unique repeating code, and configuring each said unique repeating code as a unique, binary light modulated repeating code wherein each said unique, binary light modulated repeating code from each said indicator of said plurality of indicators is of the same length,
   simultaneously detecting each said unique signal,
   developing electrical signals representative of each detected said unique signal,
   using said electrical signals representative of each said detected unique signal from each said indicator and said known relation of said indicators, calculating 6 degree of freedom information of said object.

2. The method as set forth in claim 1 wherein said configuring each said unique, binary light modulated repeating code from each said indicator further comprises synchronizing each said unique, binary light modulated repeating code so that a beginning of each said unique, binary light modulated repeating code from said plurality of indicators starts at the same time.

3. The method as set forth in claim 2 wherein said detecting each said unique signal further comprises:
   duplicating each said unique repeating code emitted from each respective said indicator,
   correlating each duplicated said unique repeating code with a respective detected said unique repeating code,
   providing a correlation strength indication between each said duplicated unique repeating code and each said detected unique repeating code,
   determining a start point for each said detected unique repeating code.

4. The method as set forth in claim 3 wherein said detecting each said unique signal further comprises:
   continuously correlating a summation of a start bit of all unique repeating codes emitted by said indicators against a summation of all detected bits,
   detecting a correlation peak when said start bit is emitted, and,
   maintaining synchronization between each emitted said unique repeating code and said duplicated unique repeating code.

5. The method as set forth in claim 2 wherein said synchronizing each said unique binary light modulated repeating code further comprises:
   summing all emitted repeating codes to produce a summation of all said emitted repeating codes,
   summing received said repeating codes to produce a summation of all said received repeating codes from said plurality of indicators,
   correlating said summation of all said emitted repeating codes against said summation of said received repeating codes,
   using a resulting correlation peak from said correlating said summation of all said emitted repeating codes against said summation of said received repeating codes to determine a starting point of each of said repeating codes from said indicators.

6. The method as set forth in claim 1 further comprising:
   combining data with one said unique signal,
   transmitting said data along with said one unique signal from one said indicator of said plurality of indicators,
   extracting said data when said unique signal is received.

7. The method as set forth in claim 1 wherein said mounting a plurality of indicators on said object further comprises mounting reflective indicators on said object.

8. The method as set forth in claim 7 further comprising illuminating said reflective indicators with light beams encoded or modulated with said repeating code, and using a different said repeating code for each reflective indicator of said reflective indicators.

9. The method as set forth in claim 7 wherein said simultaneously emitting a unique signal further comprises:
   providing each reflective indicator of said reflective indicators with a light shutter over a reflective portion thereof,
   exposing said reflective indicators to light,
   using said light shutters, modulating light reflected from each of said reflective indicators to form a respective said unique repeating code from each of said indicators.

10. A method comprising:
    associating a plurality of indicators with an object, said indicators being in a known orientation,
    causing said plurality of indicators to each simultaneously signal in a different, predetermined manner to emit modulated light to form signals, said modulated light being a repeating code wherein each said repeating code from a respective said indicator is different from other emitted repeating codes from respective other said indicators, and synchronizing each said repeating code from a respective said indicator so that said repeating codes from all said indicators start at the same time, and
    emitting said repeating codes from all said indicators synchronously,
    detecting said repeating codes from said plurality of indicators,
    developing electrical signals representative of a detected said repeating code from each indicator of said plurality of indicators,
    from said electrical signals representative of said detected repeating code from each said indicator and said known geometric orientation, determining 6 degree of freedom information of said object.

11. The method as set forth in claim 10 wherein said detecting repeating codes from said plurality of indicators further comprises:
    duplicating all said repeating codes to form duplicated said repeating codes,
    determining a starting point of all received said repeating codes,
    correlating each duplicated repeating code with a respective received repeating code,
    when correlations between all said duplicated repeating codes and all said received repeating codes are found, calculating said six degree of freedom information of said object.

12. A method comprising:
    associating a plurality of indicators with an object, said indicators being in a known orientation,
    causing said plurality of indicators to each simultaneously signal in a different, predetermined manner using a single indicator controller to simultaneously provide a different, discrete, unique code to each respective said indicator of said indicators, by using a single indicator clock source in said controller, for clocking each said indicator so that respective bits of each said different, discrete, unique code from each respective said indicator occur simultaneously,
    detecting each said different, discrete, unique code from said plurality of indicators,
    developing electrical signals representative of each detected said different, discrete, unique code from each indicator of said plurality of indicators,
    from said electrical signals representative of each said different, discrete, unique code and said known geometric orientation, determining 6 degree of freedom information of said object.

13. The method as set forth in claim 12 further comprising synchronizing a detector clock source in a detector of simultaneously received different, discrete, unique codes with said indicator clock source.

14. A method comprising:
    mounting a plurality of indicators in known relation on an object, simultaneously emitting a unique signal from each indicator of said plurality of indicators so that each said indicator emits a said unique signal,
combining data with one said unique signal,
transmitting said data along with said one unique signal from one said indicator of said plurality of indicators,
simultaneously detecting each said unique signal,
developing electrical signals representative of each detected said unique signal,
extracting said data when said unique signal is received,
using said electrical signals representative of each detected said unique signal from each said indicator and said known relation of said indicators, calculating 6 degree of freedom information of said object.

\* \* \* \* \*